Dec. 28, 1926.

A. J. BOURGEOIS 1,612,487

WINDSHIELD WIPER

Filed May 29, 1926  2 Sheets-Sheet 1

Inventor
A. J. Bourgeois,
By Clarence A. O'Brien
Attorney

Dec. 28, 1926.  
A. J. BOURGEOIS  
WINDSHIELD WIPER  
Filed May 29, 1926  
1,612,487  
2 Sheets-Sheet 2
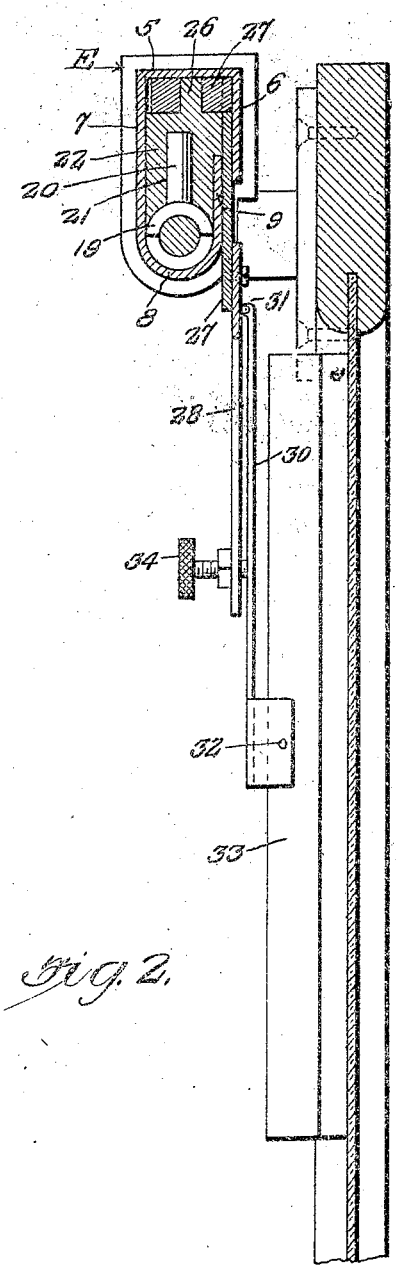
Fig. 2.
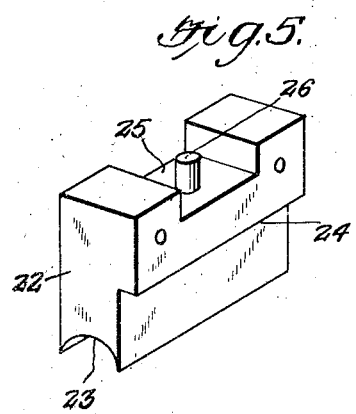
Fig. 5.
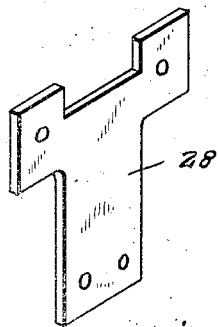
Fig. 6.
Fig. 7.
Inventor  
A. J. Bourgeois,  
By Clarence A. O'Brien  
Attorney
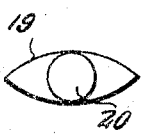

Patented Dec. 28, 1926.

1,612,487

UNITED STATES PATENT OFFICE.

AMEDE J. BOURGEOIS, OF FALL RIVER, MASSACHUSETTS.

WINDSHIELD WIPER.

Application filed May 29, 1926. Serial No. 112,697.

The present invention appertains to window cleaning devices and more particularly to a device for cleaning windshields of motor vehicles.

One of the important objects of the present invention is to provide an improved windshield wiper which may be operated automatically through means of suitable driving connections between a running or operating part of the vehicle, and a mechanism carried by the windshield for controlling the operation of a wiper or squeegee.

Another object of the present invention is to provide an exceedingly simple, practical, reliable and inexpensive construction.

With these and other objects in view as will be rendered manifest in the following specification to those skilled in the art, the invention consists in the whole, construction, and in the details of the combination as more fully described hereinafter relative to the form of the invention illustrated in the accompanying drawings, in which:—

Figure 1:
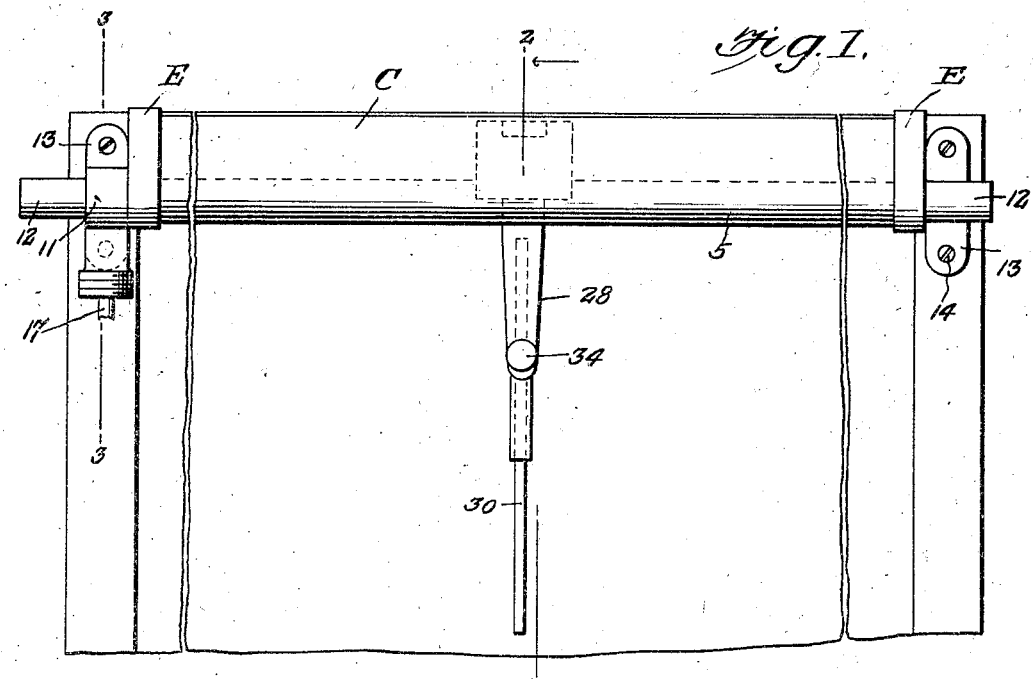
Figures 3, 4:
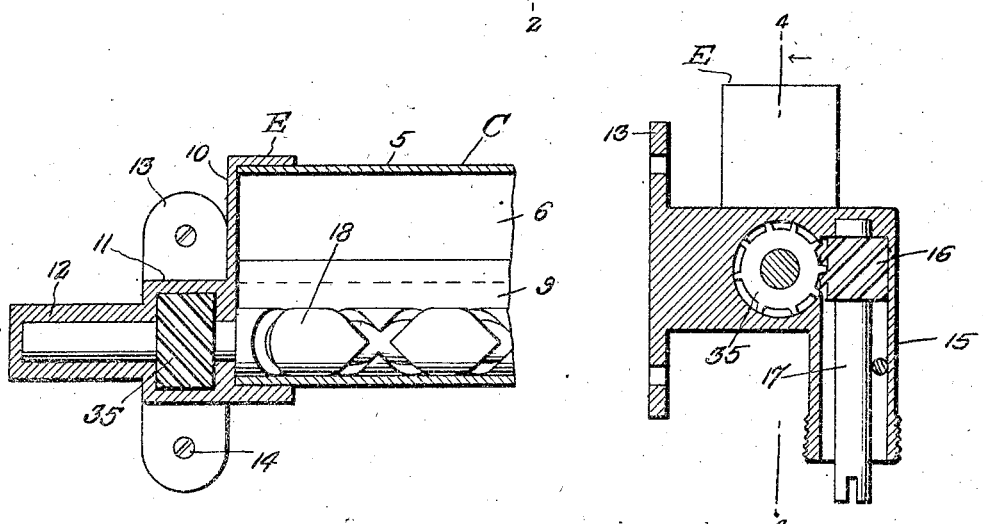

Figure 1 is a front elevation of a windshield showing my improved windshield wiper associated therewith, Fig. 2 is a vertical section taken therethru, substantially on the line 2—2 of Fig. 1, looking in the direction of the arrow, Fig. 3 is a detail vertical section taken on the line 3—3 of Fig. 1, Fig. 4 is a detail section taken substantially on the line 4—4 of Fig. 3, Fig. 5 is a perspective view of the carriage block, Fig. 6 is a perspective view of the plate, and Fig. 7 is an end elevation of the follower.

Referring to the drawing in detail, it will be seen that an ordinary windshield of conventional construction or any other preferred construction has been illustrated in the drawing. A casing C is mounted adjacent the upper edge of the windshield and consists of a preferably one piece construction including a top 5, a vertically disposed rear plate 6, a vertically disposed front plate 7, the lower end of which merges into an arcuate curved portion 8, which in turn merges into a front portion 9 over which extends the lower edge of the back 6, so as to leave a space therebetween.

End members E are mounted on the ends of the casing C and consist of cap portions 10 fitting over the casings, a worm gear housing 11, and a bearing 12. A bracket 13 is formed integrally with each piece E so that the casing and end pieces may be mounted on the windshield by use of suitable elements 14 such as the screws shown in Fig. 4.

A depending tubular housing 15 is provided on the end piece for the purpose of housing a spiral gear 16 and a shaft 17 therefor, in order that connection may be made with a flexible shaft leading from a suitable part of the automobile, in any preferred manner. A worm shaft 18 extends longitudinally through the casings C having its ends reduced and journaled in the end pieces E, this worm shaft 18 having a right handed spiral groove and a left handed spiral groove for association with a follower 19.

Thus I provide means for converging rotary motion into rectilinear and reciprocating motion. The shaft 18 is in the form of the well known drill stock and the grooves are cut therein. The follower follows one of the grooves to be moved in one direction and then the other groove in the other direction. The shaft 18 itself, is journaled in the arcuate curved bottom portion 8 of the casing C, and is therefore supported throughout its length so as to prevent vibration, which is so essential to the practical operation of a device of this nature.

The follower 19 has a shank 20 which is rotatable in the bore 21 of the carriage block 22. The bottom face of the carriage block 22 provides a semi-cylindrical recess 23 for resting on the shaft 18. The upper portion of the carriage block 22 is enlarged at one side to provide a bearing shoulder 24 adapted to slide on the upper portion of the lower rear portion 9. A recess 25 is provided in the upper surface of the carriage block and centrally located therein is an upwardly projected axle 26 on which is rotatably mounted an anti-friction wheel 27.

A plate 28 is attached to the enlarged upper portion of the carriage block 22 and extends downwardly through the space provided with the portions 6 and 9, and has an arm 29 fixed thereto in any suitable manner. A squeegee spring shank 30 is attached at its upper end as at 31 to the upper portion of the arm 28, and pivotally supports as at 32, an ordinary squeegee 33. A bolt 34 is threaded through the arm 28 for engaging the shank 30 so that the squeegee 33 may be forced toward the windshield, thus compensating for the rubber strip of said squeegee as it wears.

A spiral gear 35 is provided on one end of the shaft 28 in one of the end pieces 13 and meshes with the spiral gear 16 for transmitting the rotary motion from shaft 17 to shaft 18.

It is thought that the construction, operation, utility, and advantages of this invention will now be clearly understood by those skilled in this art without a more detailed description thereof. It is desired, however, to point out that the device is highly practical, simple in its construction, compact, convenient, possesses the advantage of ease of assembly and disassembly, affords excellent access for the purpose of lubrication, practically eliminates all vibration, and is otherwise well adapted to the purpose for which it is designed.

The present embodiment of the invention has been disclosed in detail merely by way of example, since in actual practice, it attains the features of advantage enumerated as desirable in the statement of the invention, and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. A device of the class described including an elongated casing, having a semi-cylindrical body portion, a shaft journaled in the semi-cylindrical body portion and supported substantially throughout its length therein, each means for driving the shaft, a carriage block mounted for rectilinear motion in the casing, said shaft provided with left handed and a right handed groove, a follower mounted in the carriage and associated with the grooves for translating the rotary motion of the shaft into rectilinear reciprocatory motion of the carriage, and means for attaching a windshield wiper to the carriage.

2. A device of the class described including, in combination, a casing, removable end pieces on the casing, a shaft journaled in the casing, and having extensions journaled in the end pieces, means for rotating the shaft, the bottom of the casing being arcuate to form a bearing for the full length of the shaft within the casing, said shaft provided with a right handed and a left handed groove, a follower associated with the groove, a carriage slidable in the casing and having an arcuate bottom portion, a bearing on the shaft, and windshield wiping means associated with the carriage.

3. A device of the class described including, in combination, a casing, removable end pieces on the casing, a shaft journaled in the casing, and having extensions journaled in the end pieces, means for rotating the shaft, the bottom of the casing being arcuate to form a bearing for the full length of the shaft within the casing, said shaft provided with a right handed and a left handed groove, a follower associated with the groove, a carriage slidable in the casing and having an arcuate bottom portion, a bearing on the shaft, windshield wiping means associated with the carriage, the upper surface of the carriage being provided with a recess, an axle extending upwardly in the recess, and an anti-friction wheel on the axle rotatable in the recess for bearing against the casing.

In testimony whereof I affix my signature.

AMÉDÉ J. BOURGEOIS.